UNITED STATES PATENT OFFICE.

WILLIAM RENATUS KLECKNER, OF COWELL, CALIFORNIA.

BACTERIA AND FUNGI EXTERMINATOR.

1,227,454.

Specification of Letters Patent.   Patented May 22, 1917.

No Drawing.   Application filed September 6, 1916.   Serial No. 118,650.

*To all whom it may concern:*

Be it known that I, WILLIAM R. KLECKNER, a citizen of the United States, and a resident of Cowell, in the county of Contra Costa and State of California, have invented a new and Improved Bacteria and Fungi Exterminator, of which the following is a full, clear, and exact description.

My invention relates to a bacteria and fungi exterminator intended for injection by inoculation into plants, particularly trees, shrubs and vines, for exterminating bacterial and fungicidal diseases. The object thereof is to provide effective agents for the extermination of bacteria and fungi.

It must be understood that all the chemicals herein enumerated for the extermination of bacteria and fungi are necessary for the treatment, and the subdivision into groups is to make the exterminator more efficient, by making the application of same at suitable intervals to obtain better results. It does not mean that this sequence must of necessity be followed, but it is preferable as it gives better results.

In the treatment of plants affected with bacteria and fungi, it becomes necessary to inject into the plant various doses of chemicals, all of which are materially different. The successive treatment of diseases imposes the necessity of treating in at least four intervals or periods of time with intervening periods of rest for the purpose of allowing an abatement of reactions preparatory to the successive or following treatment.

In the treatment it first becomes necessary to prepare the tissue of the plant for the reception of the specific bactericides and fungicides. The first treatment therefore is to invigorate the tissue, and the chemicals used are mixtures of double salts of potassium cyanid, which are preferably the following and in the following proportions: Equal quantities of potassium ferrocyanid, potassium ferricyanid and potassium sulfocyanid (also known under the name of thiocyanate), are mixed and the plant is inoculated with the above mixture. After the plant has been stimulated, the activity of the vegetable enzyms or soluble ferments and toxins, which is caused by the parasitic intrusion, is checked by the following mixture of chemicals: urotropin (the chemical name of which is hexamethylenetetramin) and ammonium cyanid in the following proportions,—60% of urotropin and 40% of ammonium cyanid. This mixture is inoculated into the tree by injection by means of a suitable instrument. The above mixture of urotropin and alkali cyanid when injected into the plant tissue is free to react between the urotropin and ammonium cyanid and, therefore, will liberate the formaldehyde within the tissue of the plant.

After the plant has been treated with the mixture above stated, it is inoculated with a chemical mixture, also by injection, as follows: a number of triphenylmethane dyes and a potassium xanthate. The dyes used are preferably methylene blue, methyl violet, and malachite green. The mixture is formed of equal quantities of each of the ingredients forming it, that is, there is 25% of potassium xanthate, 25% of malachite green, 25% of methyl violet, and 25% of methylene blue.

The last treatment is also by inoculation with a mixture formed of the following ingredients: extracts of rhubarb, cinnamon, allspice and cloves mixed with oxalic acid and gelatin. The above mixture is made as follows: Cinnamon, cloves, allspice and rhubarb root in equal parts by weight in powdered form are digested with a minimum amount of boiling water and filtered, allowing the extract to mix with the gelatin and oxalic acid in the container. The extract dissolves the gelatin and mixes with the oxalic acid. The solution may then be at once inoculated into the plant while in the liquid state; or, if dried, it may be cut into pellets and administered by means of a suitable device for absorption by the plant. The extracts used constitute 60% of the mixture, the oxalic acid 20%, and the gelatin 20%. The gelatin is simply a vehicle for the extracts and the oxalic acid.

The relative proportions of the total ingredients applied to a tree in the solid form or in solution are not to exceed one gram per inch of the diameter of the tree at each period of treatment, that is, if a tree is four inches in diameter, at the third treatment not over four grams of this mixture, in proportions substantially as specified, should be injected into the tree.

I claim:

1. A bacteria and fungi exterminator, consisting of a mixture of equal quantities of double salts of potassium cyanid; a mixture of ingredients adapted to liberate formaldehyde when injected into a plant; a mixture of triphenylmethane dyes and potassium xanthate in proportions as specified; and a mixture of extracts of flavoring spices, oxalic acid, and gelatin in proportions substantially as specified.

2. A bacteria and fungi exterminator, consisting of a mixture of equal quantities of potassium ferrocyanid, potassium ferricyanid and potassium sulfocyanid; a mixture of ingredients adapted to liberate formaldehyde when injected into the plant in proportions substantially as specified; a mixture of triphenylmethane dyes and potassium xanthate in proportions as specified; and a mixture of extracts of flavoring spices, oxalic acid, and gelatin in proportions substantially as specified.

3. A bacteria and fungi exterminator, consisting of a mixture of equal quantities of potassium ferrocyanid, potassium ferricyanid and potassium sulfocyanid; a mixture of urotropin and an alkali cyanid in proportions as specified; a mixture of triphenylmethane dyes and potassium xanthate in proportions as specified; and a mixture of flavoring spices, oxalic acid, and gelatin in proportions substantially as specified.

4. A bacteria and fungi exterminator, consisting of a mixture of equal quantities of double salts of potassium cyanid; a mixture of urotropin and ammonium cyanid substantially in the proportions specified; a mixture of triphenylmethane dyes and potassium xanthate in proportions as specified; and a mixture of extracts of flavoring spices, oxalic acid, and gelatin in proportions substantially as specified.

5. A bacteria and fungi exterminator, consisting of a mixture of equal quantities of double salts of potassium cyanid; a mixture adapted to liberate formaldehyde when injected into a plant; a mixture in equal proportions of methylene blue, methyl violet, malachite green, and potassium xanthate; and a mixture of the extracts of flavoring spices, oxalic acid, and gelatin in proportions substantially as specified.

6. A bacteria and fungi exterminator, consisting of a mixture of equal quantities of double salts of potassium cyanid; a mixture of ingredients in proportions specified adapted to liberate formaldehyde when injected into a plant; a mixture of triphenylmethane dyes and potassium xanthate in the proportions specified; and a mixture of extracts of rhubarb, cinnamon, allspice and cloves, oxalic acid, and gelatin in proportions substantially as specified.

7. A bacteria and fungi exterminator, consisting of a mixture of potassium ferrocyanid, potassium ferricyanid and sulfocyanid; a mixture of urotropin and ammonium cyanid; a mixture of methylene blue, methyl violet, malachite green and potassium xanthate; and a mixture of extracts of rhubarb, cinnamon, allspice and cloves, oxalic acid, and gelatin, all of the above ingredients in the proportions as specified.

WILLIAM RENATUS KLECKNER.